United States Patent
Snellman et al.

[15] 3,646,372
[45] Feb. 29, 1972

[54] ELECTRONIC DEVICE FOR DETECTING THE PASSAGE OF NONCONDUCTIVE SHEETS

[72] Inventors: Donald L. Snellman; Richard A. Marson, both of Seattle; Ernest D. Davis, Richmond Beach, all of Wash.

[73] Assignee: Norfin, Inc., Seattle, Wash.

[22] Filed: June 5, 1967

[21] Appl. No.: 643,635

[52] U.S. Cl. ............................307/308, 307/252 B, 328/5, 340/258
[51] Int. Cl. .......................................................G01n 27/00
[58] Field of Search...................340/258, 259, 258 C; 328/5; 331/65; 209/111.5; 324/61 B; 307/252, 308, 305

[56] References Cited

UNITED STATES PATENTS

| 2,312,357 | 3/1943 | Odquist et al. | 328/5 |
| 2,676,298 | 4/1954 | Frommer | 328/5 |
| 3,039,051 | 6/1962 | Locher | 324/61 |
| 3,161,835 | 12/1964 | Leenhouts et al. | 340/259 |
| 3,197,658 | 7/1965 | Byrnes et al. | 340/258 X |
| 3,255,380 | 6/1966 | Atkins et al. | 340/258 X |

Primary Examiner—Donald D. Forrer
Assistant Examiner—B. P. Davis
Attorney—Seed, Berry & Dowrey

[57] ABSTRACT

Series inductance-capacitance circuit is coupled and tuned to resonance with a constant frequency signal source. The circuit includes capacitance sensor plates which sense the passage of double thickness nonconductive sheets and change the reactance of the circuit to produce a voltage change at the input to the circuit. This voltage change is detected and actuates a switch.

7 Claims, 1 Drawing Figure

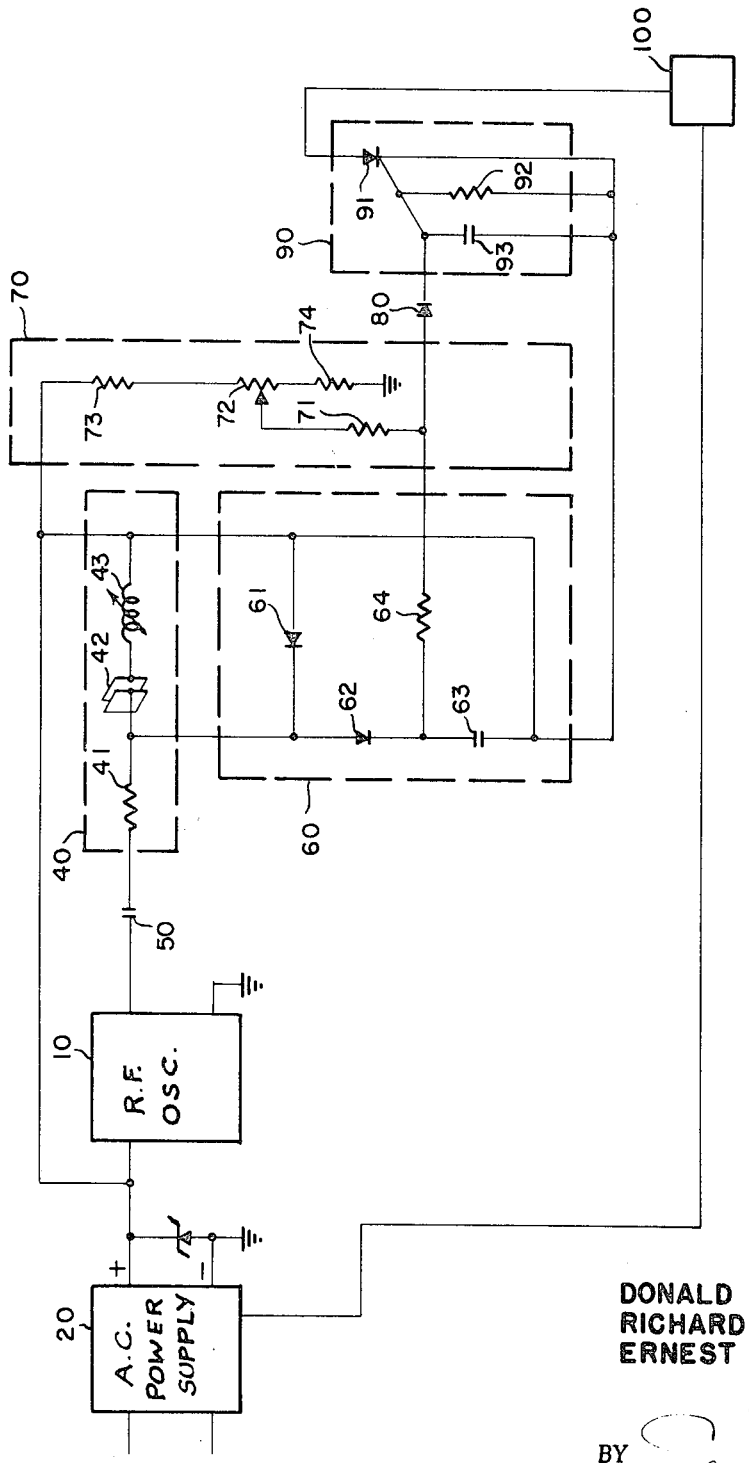

ELECTRONIC DEVICE FOR DETECTING THE PASSAGE OF NONCONDUCTIVE SHEETS

This invention is an electronic device for detecting the passage of sheets of nonconducting material such as paper. More particularly, this invention is an electronic device for detecting the passage of nonconductive sheets from a sheet feeding device and for triggering a mechanism in response to such sheet passage.

In high-speed sheet-handling equipment, such as collators, that are designed to handle single sheets of paper, the simultaneous passage of multiple sheets of paper or other nonconductive material from a sheet feeder or the like can easily go undetected. A primary object of this invention is to provide an electronic device that can detect the multiple passage of nonconductive sheets, such as paper, and trigger a mechanism to reject the multiple sheets. A further object is to provide such a device especially designed for use in conjunction with a collator sheet feeder. Another object is to provide such a device having high sensitivity without consisting of highly complex electronic circuitry.

Furthermore, in such sheet handling equipment, it is often desirable to count, or segregate the nonconductive sheet material by thickness or grade. It is therefore another object of this invention to provide an electronic device that can detect the passage of nonconductive sheet material and trigger a counting or sheet deflecting mechanism in response thereto.

These and other objects and advantages will become apparent from the following disclosure in conjunction with the accompanying drawing which depicts a preferred circuit embodiment of this invention.

In brief, this invention is a circuit designed to detect the passage of sheets of nonconductive material between capacitance sensor plates of a series inductance-capacitance circuit coupled into the RF output of an oscillator. The inductive-capacitance circuit is tuned to resonance with the oscillator and effectively short circuits the RF output when no sheet material is passing between the sensor plates. When sheet material passes between the sensor plates, the resulting increase in the dielectric constant increases the reactance of the tuned circuit which results in a proportional voltage increase at the output of the tuned circuit. This proportionally increased voltage is detected by detector means and applied to semiconductor switch means which activates a desired device when the input voltage thereto attains or exceeds a predetermined level. The predetermined voltage trigger level is adjustable by voltage divider means which sets the bias the threshold voltage of the semiconductor switch means.

With reference to the FIGURE, a preferred embodiment of this invention comprises an RF oscillator 10, powered by an AC power supply 20, a series inductance-capacitance circuit 40 coupled to the output of oscillator 10 and tuned to resonance with the oscillator 10, a voltage doubler rectifier circuit 60 detecting the output of the oscillator 10, a voltage divider circuit 70 across the power supply 20 for setting the bias and gating threshold of a silicon controlled rectifier (SCR) 91 for the control of a device 100.

The oscillator 10 is employed to provide a constant source of radiofrequency energy. Any suitable circuit may be employed, such as a Colpitts-type oscillator with the tuned tank circuit connected between the emitter and collector of a transistor.

The tuned circuit 40 is connected to the oscillator output by a capacitance 50 and to power supply B+. The circuit comprises a resistance 41, a capacitance 42 which comprises a pair of parallel sensor plates spaced apart with an air dielectric therebetween, and an adjustable inductance 43.

The voltage doubler rectifier circuit 60 is connected into the tuned circuit 40 between resistance 41 and capacitance 42, and to power supply B+. The circuit 60 comprises diodes 61 and 62, a filter capacitance 63 and a resistance 64. Use of a voltage doubler circuit to detect the oscillator output permits less critical adjustment of the device's variable components. The return from circuit 60 through capacitance 63 is to power supply B+.

The gating circuit 90 comprises SCR 91, and resistance 92 and capacitance 93 interconnected in parallel across the gate and cathode of SCR 91. The gate of SCR 91 is connected to the output from the voltage doubler and rectifier circuit 60 by a breakdown diode 80. Diode 80 is selected to have a breakover voltage slightly in excess of the gate trigger voltage of SCR 91 and to have a breakover time slower than the average transient to be experienced. Therefore, the likelihood of the SCR 91 being triggered by spurious signals is greatly reduced. The gating circuit return from the SCR 91 is to power supply B+ and the circuit of the anode of SCR 91 is connected through the device 100 to the power supply B+.

The voltage divider circuit 70 comprises resistances 73 and 74 and a variable resistance 72 in series with power supply B+ and ground, and a resistance 71 interconnecting the variable tap of resistance 72 and the output of the voltage doubler rectifier circuit 60. A voltage divider across the power supply can be used in setting the bias and threshold of the SCR 91 without the use of a separate negative voltage supply. Adjustment of the bias is made through variable resistance 72 and any other elements of the voltage divider system which may be made variable for the purposes of calibration.

When the tuned circuit 40 is tuned to resonance with the oscillator 10, the decrease of reactance at resonance results in an effective short circuit for the RF output of the oscillator. A change in the dielectric constant of the capacitance 42, occurring when a nonconductive paper sheet passes between the sensor plates, cause the resonant frequency of circuit 40 to change. This results in an increasing reactance of circuit 40, with a consequent rejection of a portion of the RF output of the oscillator and with a proportional voltage increase at the input to circuit 40. The concommitant voltage increase is detected, rectified and doubled by the diode circuitry of circuit 60 and applied to the gate of SCR 91. When this applied gate voltage reaches the trigger voltage of SCR 91, the SCR will fire, actuating device 100.

In practice, the resistance 72 will be adjusted to regulate the effect of the applied voltage on the gate of SCR 91. For example, resistance 72 can be adjusted such that two or more paper sheets must pass simultaneously between the sensor plates of capacitance 42 to detune circuit 40 sufficiently to effect a large enough gate voltage to trigger SCR 91.

If device 100 is a relay operated reject device, the circuit's detection of a "double sheet" can actuate the device 100 to reject the double sheets. Thus, the invention can be applied to apparatus such as a sheet collator to ensure that only single sheets will be fed to the collator and that "doubles" will be rejected. The circuit of this invention can also be applied to distinguish between sheets having different dielectric constants resulting, for example, from different thicknesses or from different grades of sheet material.

In these latter examples, device 100 would be adapted to segregate the sheets according to thickness or grade or to deflect those sheets not within predetermined thickness or grade limits. Furthermore, the circuit of this invention can be employed to count sheets, in which case device 100 would be a counter triggered by circuit response to the change in dielectric constants of capacitance sensor plates 42 as sheets pass therebetween.

It has been found that the sensitivity of the circuit is enhanced with a resonant frequency of about 40 kc. and with each sensor plate of capacitance 42 having an equal area of about 28 sq. in. The resonant frequency can be between 38 and 42 kc. and each sensor plate area can be between 26 and 30 sq. in. without appreciably affecting this sensitivity. It has been found that the circuit itself may be inherently less sensitive at frequencies lower than 38 kc. and that the sensor plates may become too small at frequencies higher than 42 kc. to sense the different dielectric constants of the sheet material passing therebetween as accurately, of course, the width of the sheet material is an important variable in determining these optimum ranges.

It is believed that the invention will have been clearly understood from the foregoing detailed description of our now-preferred illustrated embodiment. Changes in the details of the construction may be resorted to without departing from the spirit of the invention and it is accordingly out intention that no limitations be implied and that the hereto annexed claims be given the broadest interpretation to which the employed language fairly admits. For example, where greater sensitivity or more rigid clamping is desired for more precise applications, either RF or DC amplifiers may be used for the degree of gain required.

The embodiments of the invention in which an exclusive property or privilege is claimed are defined as follows:

1. Apparatus for detecting the passage of sheets of nonconductive sheet material which comprises signal source means for providing a constant frequency output signal, resonant circuit means electrically connected in series with said signal source means to receive said constant frequency output signal, said resonant circuit means including an inductor connected in series with a capacitor, the inductor-capacitor circuit being tuned to resonance with the constant frequency output signal to normally operate as substantially a short circuit for said output signal, said capacitor including a pair of sensor plates adapted to have nonconductive sheet material passed therebetween to increase the reactance of said inductor-capacitor circuit, detector circuit means connected to the input of said resonant circuit means for detecting a voltage change at the input of said resonant circuit means due to a change in reactance of said inductor-capacitor circuit resulting upon the passage of nonconductive sheet material between said sensor plates, and semiconductor switch means electrically connected to said detector circuit means, said semiconductor switch means being activated when the voltage change detected by said detector circuit means attains a predetermined level.

2. Apparatus according to claim 1 wherein said signal source means includes a stable oscillator having a resonant frequency of between 38 and 42 kc.; and wherein each said sensor plate has an area of between 26 and 30 sq. in.

3. Apparatus according to claim 1 wherein said semiconductor switch means includes a silicon-controlled rectifier with its gate electrically connected to the output of said detector circuit means.

4. Apparatus according to claim 1 wherein said detector circuit means includes a diode voltage doubler and rectifier circuit.

5. Apparatus according to claim 3 including adjustable voltage divider means electrically connected to said semiconductor switch means and adapted to set the bias and threshold voltage of said semiconductor switch means.

6. Apparatus according to claim 1 including a control device electrically connected to said semiconductor switch means and operated in response to actuation of said switch means.

7. Apparatus according to claim 5 wherein said signal source means includes a stable RF oscillator and said detector circuit means includes a diode voltage doubler and rectifier circuit.

* * * * *